(12) United States Patent
Conti

(10) Patent No.: US 6,450,238 B1
(45) Date of Patent: Sep. 17, 2002

(54) CONTAINER CONVEYOR SYSTEM

(75) Inventor: Aldo Conti, Turin (IT)

(73) Assignee: Fata Aluminium division of Fata Group S.p.A., Turin (IT)

( * ) Notice: Subject to any disclaimer, the term of this patent is extended or adjusted under 35 U.S.C. 154(b) by 0 days.

(21) Appl. No.: 09/513,843

(22) Filed: Feb. 25, 2000

(30) Foreign Application Priority Data

Feb. 26, 1999 (EP) .............................................. 99830105

(51) Int. Cl.⁷ .............................. B22D 5/04; B65G 17/18
(52) U.S. Cl. ........................ 164/324; 164/331; 198/800
(58) Field of Search ................................ 164/324, 331, 164/167, 168; 198/793, 800

(56) References Cited

U.S. PATENT DOCUMENTS

| 1,798,485 A | | 3/1931 | Mulvihill |
| 4,947,923 A | * | 8/1990 | Rikker ........................... 164/5 |

FOREIGN PATENT DOCUMENTS

| DE | 27 56 422 | 6/1979 |
| EP | 0 297 761 | 1/1989 |
| EP | 0 370 589 | 5/1990 |
| FR | 2 650 575 | 2/1991 |
| GB | 1 490 878 | 11/1977 |
| GB | 2 056 341 | 3/1981 |

* cited by examiner

Primary Examiner—M. Alexandra Elve
Assistant Examiner—Len Tran
(74) Attorney, Agent, or Firm—Sughrue Mion, PLLC

(57) ABSTRACT

The system comprises at least one conveyor tract along which a line of containers is made to move forward by a pusher action applied at one end of the line. A plurality of transport elements can be aligned on the conveyor tract and are capable of receiving at least one respective container of the line, with the containers separated from each other. The transport elements are capable of cooperating with each other in thrust transmission, so that the pushing action applied to the transport elements produces the forward movement of the line of containers while the containers themselves are kept separate from each other.

3 Claims, 3 Drawing Sheets

CONTAINER CONVEYOR SYSTEM

BACKGROUND OF THE INVENTION

The present invention relates to container conveyor systems and, more particularly, a system that can be used, for example, to transport foundry moulds. State-of-the-art technique concerning such systems is very extensive, as is borne out—for example—by U.S. Pat. No. 1,798,485.

The system described in the said document comprises a plurality of trolleys moving on rails laid out to form a loop consisting of two parallel straight lines that are joined by appropriately curved sections at both ends. The movement of the trolleys along the rails is obtained by means of a pushing unit that causes the trolleys to move forward in an intermittent manner.

Various factors have to be borne in mind when realizing systems of this kind. Some of these are bound up with the layout of the structure along which the trolleys are to be moved and the manner in which this movement is to be obtained.

In particular, the choice of employing a rail system laid out in the manner of a loop that has bends at the two ends is associated with the undoubted advantage provided by the fact that the trolleys can be moved along the rail like the carriages of a train: one need only think, for example, of the trolleys of a narrow-gauge railway of the type often used, for example, in mining installations. On the other hand, the presence of the two curved sections constitutes an intrinsic limitation as far as encumbrance is concerned, because the radius of curvature of the terminal bends cannot be reduced below minimum limits that depend on the size of the trolleys employed.

As far as trolley movement control is concerned, on the other hand, one solution—in many ways ideal—is to provide each trolley with its own motor means (an electric motor, for example). The principal advantage of this solution derives from the fact that the movement of each trolley can be controlled in a wholly independent manner. It is thus possible, for example, to arrange matters in such a way that one or more trolleys will be standing still in front of some processing station, to let the castings in the moulds pass through a cooling phase for example, while other trolleys will be on the move between successive processing stations. But this solution can prove very costly, especially in complex systems that involve a large number of trolleys, precisely because has to be provided with its own motor and control means, as also with means for supplying the necessary energy. Nor must one forget the fact that a working environment like the one constituted by foundries can prove very hostile for electric motors and the organs normally associated with them.

These critical factors suggest the realization of systems like the one used as model for the preamble of claim 1 hereinbelow. The system in question is a container conveyor system, especially for foundry applications, and has been produced for many years by the present applicants.

The guide structure of the said system is made up of two straight and parallel transport tracts, each of which accommodates a rectilinear line of containers devoid of motors of their own and moving forward on, for example, rollers or similar. At its two ends, moreover, the system—which thus assumes the general configuration of a rectangle—also comprises appropriate transfer devices capable of transferring the containers from one straight line of non motorized trolleys to the other in accordance with a general container circulation pattern.

The movement of the containers that find themselves on the two rectilinear conveyor tracts is obtained thanks to the action of two pusher organs (which may be hydraulically operated, for example), each of which pushes its line of containers, which bear against each other without solution of continuity, moving them forward a step at a time, where the length of the step usually corresponds to the dimension of the individual container in the direction of motion. A complementary and structurally similar organ operates on the opposite end of each conveyor tract and has the task of realizing an action that will oppose the forward motion under the action of the pusher of the back-to-back container lines, but will do so in a yielding and controlled manner. At the two ends of each rectilinear conveyor tract there are usually arranged appropriate thrust-counteracting units intended to ensure that the step-by-step forward movement of the container lines will take place in a regular and controlled manner.

In actual practice, the pusher devices, of which there is one on each rectilinear conveyor tract, operate in a coordinated manner and in opposite directions, while the transverse transfer devices at the two ends of the system act likewise in a coordinated manner and in opposite directions, so that on each occasion they will pick up a single container at the output end of one rectilinear conveyor tract and transfer it to the immediately adjacent input end of the other container line. Taken as a whole, the described actions will thus realize a general circulatory movement of the containers along the conveyor structure of the system. A system of this kind can be used, for example, in a plant operated in accordance with what is currently known as <<lost-foam>> technology. Along the line of motion of the containers there will thus be arranged a series of processing stations, each designed to perform a specific operation on the said containers: placing the polystyrene models into the containers, filling the containers with sand, vibrating the sand in order to distribute and compact it evenly around the polystyrene models, pouring the casting material and, lastly, extracting the castings from the containers and removing the sand carried in the containers. The operations of filling and vibrating the sand are usually carried out in several successive steps.

An intrinsic drawback of the solution in accordance with the previously described known technique is constituted by the fact that during the performance of the operation or operations of vibrating the sand care has to be taken to ensure the vibratory motion applied to the container or containers in which the sand is being compacted will not be transmitted to any of the adjacent containers. As we saw in the previous description, the said containers are arranged back-to-back, so that the vibrated container would normally be in direct contact with another container on either side of it.

For this reason, the systems of this type so far produced by the present applicants always had to make provision for at least slightly separating these adjacent containers from the container that at any given time was being subjected to vibration.

On completion of the vibration operation and before the line of containers can resume its forward movement, the previously created distance to separate the adjacent containers must therefore be eliminated under the action of the pusher device, thus bringing the containers once more into their original back-to-back condition.

These operations can therefore give rise to undesired impact phenomena between adjacent containers and, more particularly, undesired displacements of the polystyrene models inserted into the said containers and not yet completely covered by sand.

SUMMARY OF THE INVENTION

Notwithstanding this problem, the system just described is associated with considerable advantages, especially as regards its simplicity and operational reliability.

The present invention therefore has the scope of realizing a system of the type specified hereinabove that will be devoid of the previously described negative phenomena, while yet preserving the aforesaid characteristics of simplicity and reliability.

BRIEF DESCRIPTION OF THE DRAWINGS

According to the present invention, this scope is attained thanks to a system having the characteristics set out in the claims attached hereto.

The invention will now be described, though purely by way of example and not to be considered limitative in any way, by reference to the attached drawings, where:

Referring to FIG. 1, the reference number 1 indicates the whole of a plant for transporting the containers C comprised in a foundry installation operated, for example, in accordance with what is currently known as <<lost-foam>> technology.

Figure 1:
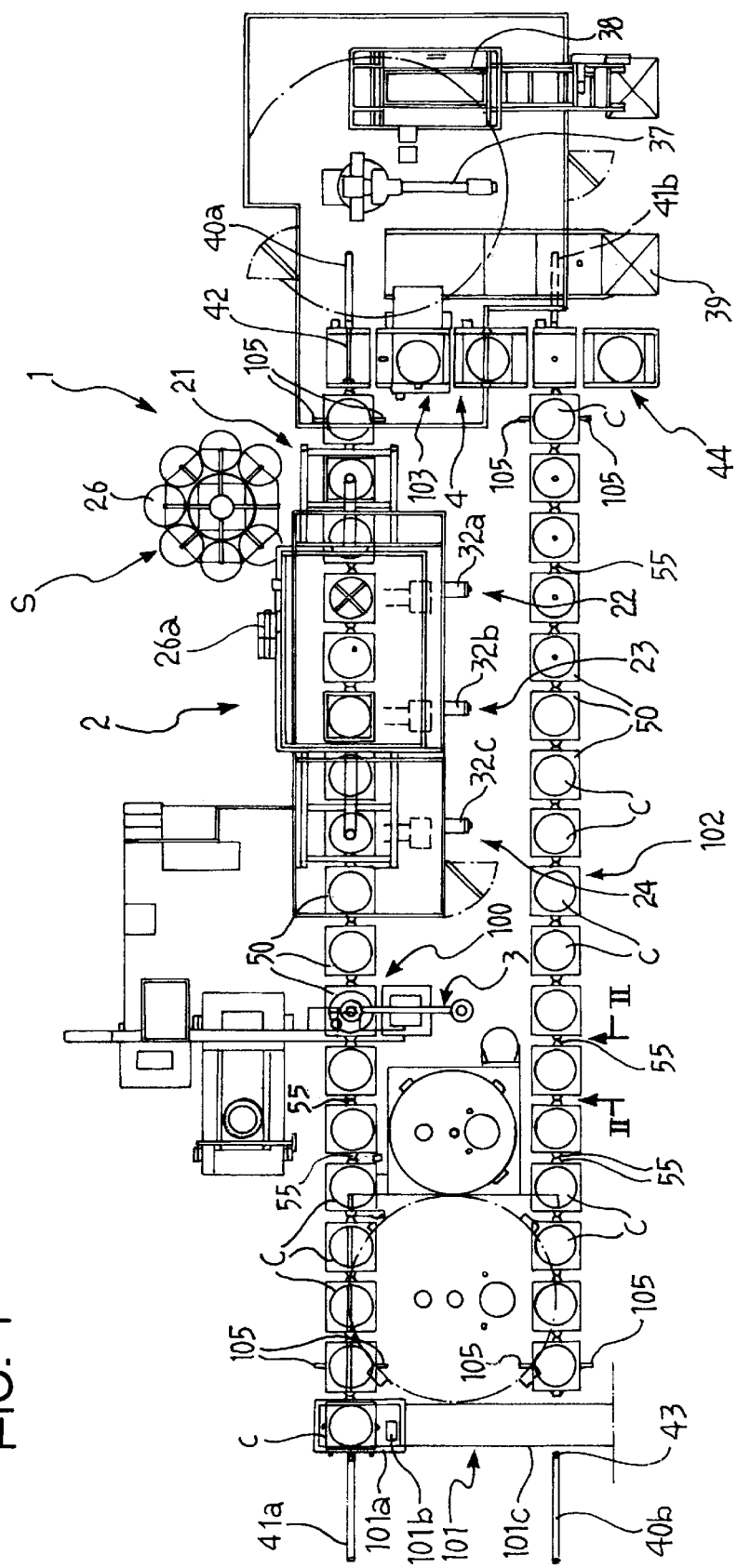
FIG. 1 shows a general view in side elevation of a container transport system according to the invention.

The system is intended to move the containers C, in practice similar to large buckets, in accordance with a general circulation pattern that will cause the said containers C to pass successively through the following processing stations:

a loading station 2, where polystyrene models S (which are usually clusters of interconnected individual models) are inserted into the containers C, the said containers C—in successive phases—being thereafter filled with sand and then subjected to vibration in order to obtain complete and consistent compaction of the sand around the models S, a casting station 3, where the casting material (typically molten metal) is poured into the containers in such a way as to cause it to dissolve and eliminate the material of the polystyrene model and occupy the volume previously occupied by the said model, and a discharging station 4, where—following an appropriate cooling period—the castings formed by the poured material are extracted from the containers C, which are then emptied of their sand contents, after which they can again be fed to the loading station 2.

DETAILING DESCRIPTION OF THE INVENTION

Usually, the loading station 2 comprises, in the implementation example here illustrated (and which, be it specifically recalled, is no more than an example), four successive filling substations, which are here indicated by the consecutive numbers 21 to 24 in the order in which the containers C pass them on their way through the station.

At the substation 21 a certain quantity of sand is fed into the bottom part of the container C that happens to be at the substation 21 at the time. At the next substation, indicated by the reference number 22, the polystyrene models S (usually in the form of clusters, as already mentioned) are placed into the containers C (the bottom part of which already contains a certain quantity of sand). The models S are picked up from a feeder turntable 26 by means of an anthropomorphic robot 26a that transfers the models into the substation 22, where a further quantity of sand is allowed to drop into the container C, generally sufficient to cover a goodly part of the height of the model cluster S.

At the same time (or, preferably, just before the sand feeder is brought into operation) the container C is slightly lifted in a vertical direction, so that it becomes detached from the conveyor structure (subsequently to be described in greater detail); the gripping organs 31a used to obtain this lift are of a known type (see FIG. 3) and are subsequently made to vibrate by means of a vibration device 32a. The said vibration realizes the desired compaction of the sand fed into the container C.

The action of filling sand into the container C is then completed at the downstream substations indicated by 23 and 24, both of which are equipped with lifting means, and also with vibration devices 32b and 32c that are substantially similar to the vibration device 32a already mentioned in connection with substation 22.

The choice of realizing the filling and the vibration of the containers C in successive phases is in keeping with the need for gradual immersion of the model cluster S in the sand, thereby assuring that the sand around it will become fully compacted. This choice is also imposed by the general needs bound up with the timing of the forward movement of the containers on the conveyor system and assuring the desired productivity levels.

A more complete description of the station 2 and the manner in which it operates will be found in another European patent application filed by the present applicants on the same date.

It will readily be appreciated that in the plan view of FIG. 1 the loading station 2 and the pouring station 3 are arranged in close proximity along one of the two parallel rectilinear branches of the general circulation pattern of the containers C within the system 1. As seen from the observation point of FIG. 1, the said circulatory movement is realized in an anti-clockwise direction, so that, after passing through the pouring station 3, the containers C complete their forward motion along the first rectilinear tract of the system, here indicated by the reference number 100, and then, with the help of a transfer device 101 that acts in a direction perpendicular to the direction of motion on the tract 100, are passed onto a second rectilinear conveyor tract 102 that is parallel and substantially similar to the tract 100. At the end of the tract 100, the containers C encounter another transfer device 103 that is functionally (though, as we shall see, not necessarily structurally) similar to the previous one and transfers the said containers C from the discharge station 4 to the input end of the first rectilinear tract of their circulation pattern.

It should be noted that the relative arrangement of the processing stations here illustrated is such as to achieve the goal of maximizing—all other things being equal—the distance that the containers C have to cover on their way from the pouring station 3 to the discharge station 4 and thus maximizing also the time available for the castings to cool.

Furthermore, it should be made clear that the characteristics of the stations 2 to 4 as here described are well known to the state of the art and do not therefore call for any more specific description, not least because they are not in themselves relevant for the purposes of understanding the invention. This is particularly true as regards the manner in which the castings are removed from the containers at the discharge station 4 (an operation that is usually performed with the help of another anthropomorphic robot 37 that transfers the castings to a further cooling and accumulation station 38) and the said containers are then tipped to permit their sand content to drain out. The sand is then conveyed to a recovery station 39, where—prior to being returned to the filling station 2—it is cooled, cleaned and partially renewed by the removal of a fraction of the used sand, which is replaced by a. corresponding quantity of fresh or regenerated sand, the whole in a continuous-cycle operation.

These operations, once again, are carried out in accordance with criteria that for our immediate purposes do not have to be specifically described.

As regards the general criteria that regulate the movement of the containers C, the solution according to the invention envisages, situated at the ends 100 and 102 of the two principal rectilinear conveyor tracts, a pusher element 40a 40b situated at the input and an appropriate counteracting element 41a, 41b situated at the opposite end and operating in a coordinated manner with its associated pusher element.

Referring to the plan view shown in FIG. 1, the pusher element 40a of the tract 100 pushes the line of containers C from the right to the left, while the counteracting element 41a tends to brake and regulate this movement. As far as the tract 102 is concerned, similarly, the pusher element 40b pushes the containers from the left to the right against the controlled braking action of the element 41b at the opposite end of the tract.

The view reproduced as FIG. 1, in particular, shows the system in a condition in which the pusher element 40a (which, just like the element 40b, usually consists of a linear actuator like a hydraulic jack) has just used its pusher shaft 42 to push the containers C in such a manner as to bring the container C situated at the downstream end of the tract precisely into line with the transfer device 101 situated at the opposed end of the tract 100. There the transfer trolley 101a of the device 101 (a trolley of known type, usually provided with its own motor means 101b that enable it to move along the rail 101c) is getting ready for transferring the container C in question to the tract 102.

Turning now to the said tract 102, and particularly the upstream end of this tract (where upstream, of course, is to be understood in relation to the direction of motion of the containers C), the pusher element 40b has its pusher shaft 43 in a retracted position and is therefore ready to act on the arriving container C as soon as the device 101 will have transferred it to the tract 102 and aligned it there.

The movement of the containers C on the branch 102 is realized in exactly the same manner as already described for the branch 100.

As far as the other transfer device 103 is concerned, its characteristics may be exactly the same as those of the device 101; but it is also possible to adopt different solution, a case in point being the use of individual motorized transfer elements, especially to render possible the regulated step-by-step movement of the containers C in front of the discharge station 4.

Although it is not imperative, the choice of a solution of this type proves to be particularly advantageous, for example, when it is desired to arrange for the inclusion of a holding station 44, generally in a position off the line or loop on which the containers C are moving in the system 1, where at least one container can be kept ready, for example, to take the place of another container C that for some reason or other has to be taken out of circulation. Above all, such a holding station 44 can also be used as a container loading station.

An important characteristic of the solution according to the invention derives from the fact that the action of pushing the lines of containers C on the two rectilinear tracts 100 and 102 is not realized directly on the containers C placed back-to-back, but rather on appropriate transport elements such as the trolleys 50, of which there is one for each container. Preferably, the containers C should rest freely on the trolleys 50, so that they can readily be lifted , for example, by the structures 31a, 31b and 31c acting at the substations 22, 23 and 24.

Figure 2:
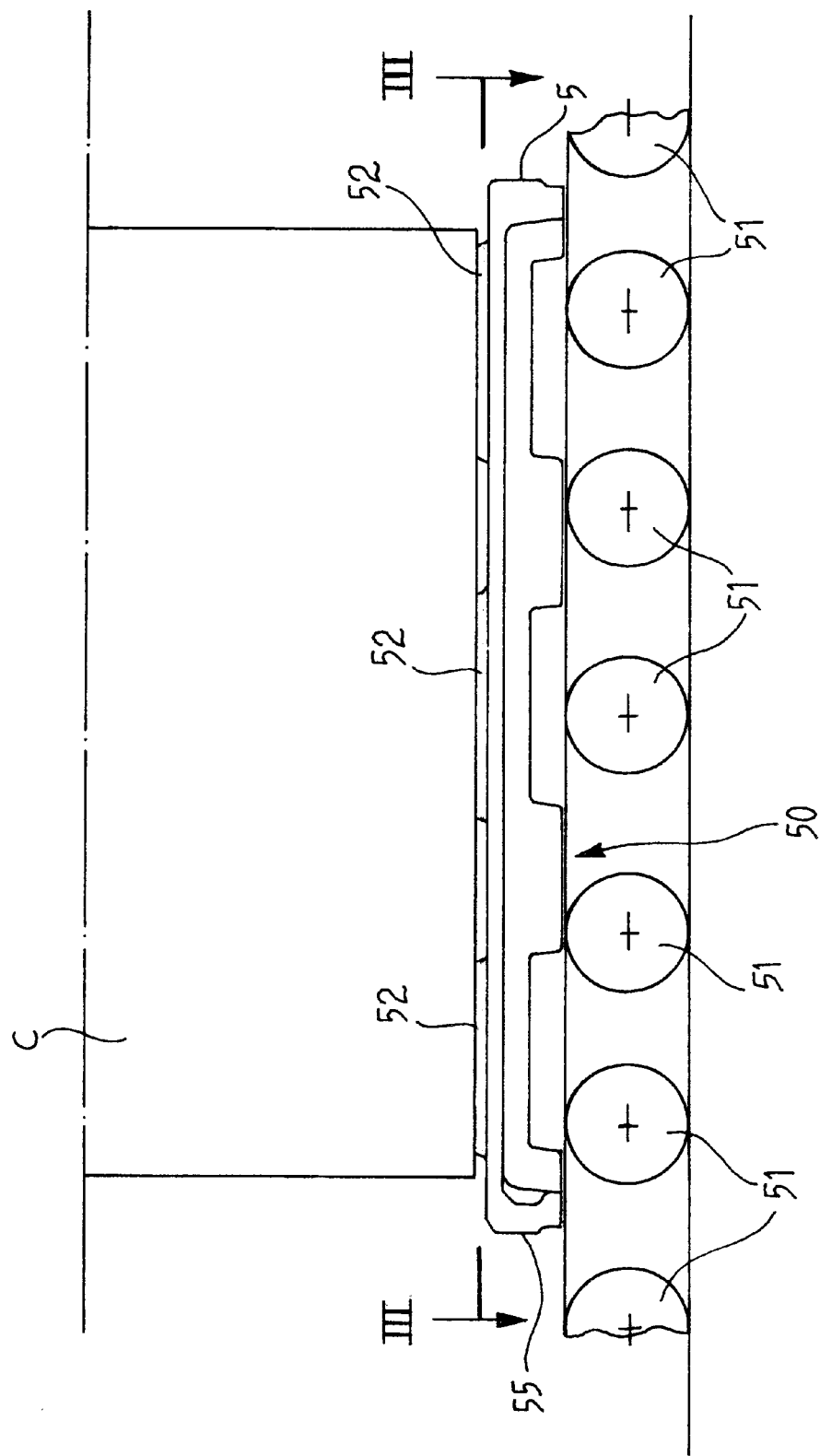
FIG. 2 shows a section along the line II—II of FIG. 1, though reproduced at a larger scale.
Figure 3:
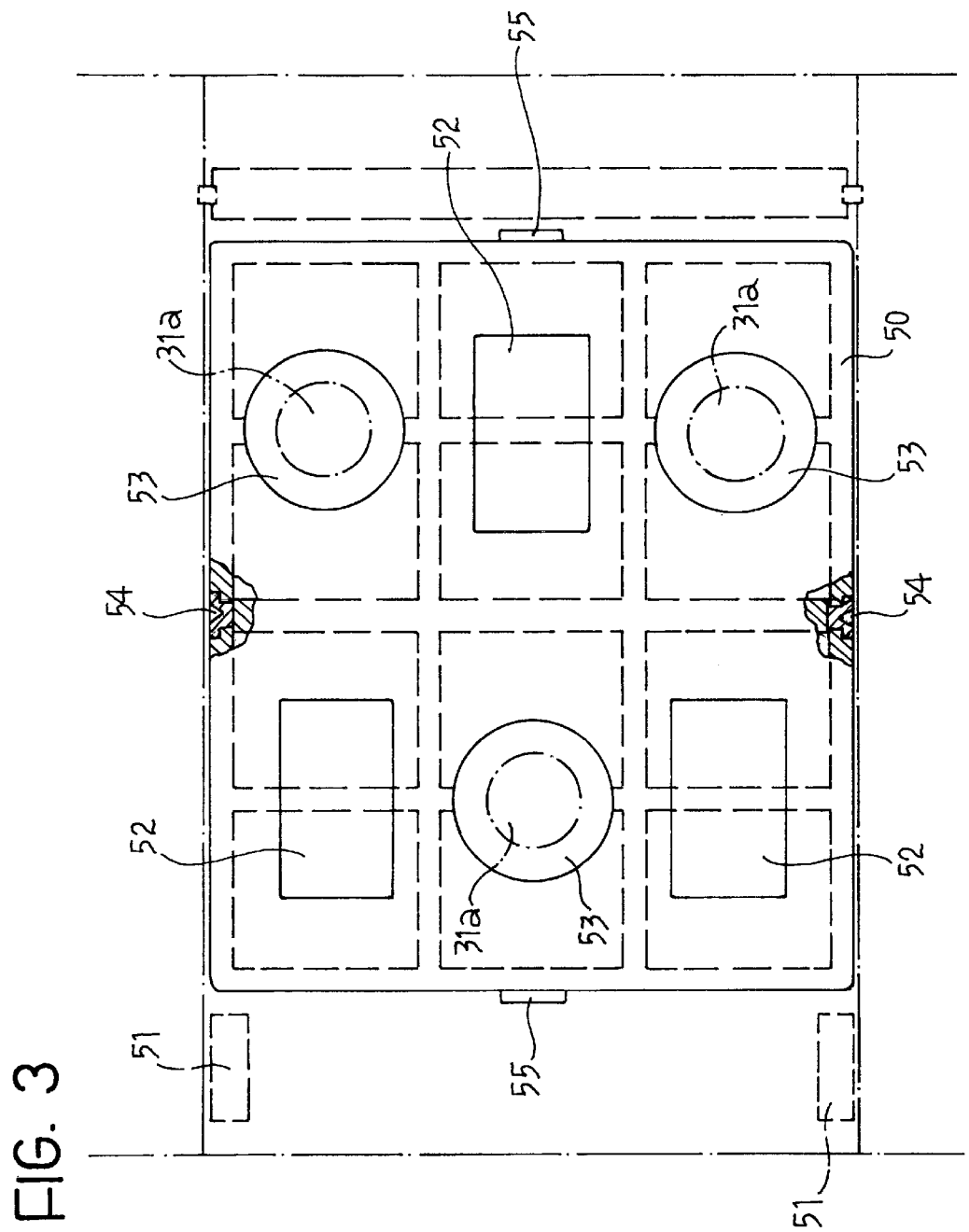
FIG. 3 shows essentially a view along the line III—III of FIG. 2 and therefore to all intents and purposes a plan view of the element shown in FIG. 2.

A typical embodiment is shown in greater detail in FIGS. 2 and 3, where the trolleys 50 consist of slab-like frames that are substantially similar to pallets capable of freely moving forward on means of movement that comprise, for example, such revolving bodies as the sets of rollers 51 that define the conveyor lines of the tracts 100 and 102 of the system.

As far as the practical realization of the rollers 51 is concerned, recourse can be had to a series of solutions that are functionally equivalent to each other. A first solution is the one of realizing the two conveyor tracts 100 and 102 as roller beds defined by lines of rollers that extend over the entire width between the two opposite sides of each conveyor tract, with the axis of each roller placed at right angles to the direction of motion of the trolleys 50. In a possible alternative solution the rollers 51 could consist simply of paired rollers or wheels located on the two sides of the conveyor tract and capable of sustaining the trolleys.

These two alternatives, which are only two of the many possible ones, are schematically illustrated in FIG. 3. In particular, on the right of this figure there is shown—drawn with dotted lines—the possible profile of a roller 51 that extends over the entire width of the roller bed of the trolleys 50. On the left of this figure, on the other hand, there is shown, likewise with dotted lines, a possible realization of these rollers in the form of rollers or wheels on the two sides of the conveyor tract that limit themselves to sustaining the trolleys 50 on their longitudinal sides.

The trolleys 50 can be realized in the form of slab-like metallic bodies appropriately ribbed for stiffening purposes and possibly provided with raised parts intended to support the containers C in such a way that their bottom parts will be at least slightly detached from the general surface of the trolley bed. The trolleys 50 can be advantageously provided with openings 53 that will permit the passage of the formations 31a, 31b and 31c intended to lift the containers C in regions in which the vibrator device 32a–32c are acting. In particular, the size of the openings 53 are chosen in such a way that the lifting means 31a, whenever they are set vibrating by the devices 32a–32c, will always remain away from the sides of these openings 53 (and will not therefore come into contact with them). The vibratory motion will thus be transferred solely and exclusively to the lifted container and not to the trolley 50 beneath it; it goes without saying, therefore, that it cannot become propagated to the adjacent trolleys 50 and containers C.

Preferably, the trolleys 50 will be provided on their sides with bored formations 54 that can be engaged by such positioning devices as the elements indicated by the reference number 105 in the plan view of FIG. 1. These elements have the function of gripping the trolleys 50 at the position of the said formations 54 and thus acting as a kind of fine adjustment that the trolleys 50 will always reach the upstream and downstream ends of the conveyor tracts 100 and 102 in exactly determined positions that they will subsequently retain, thus rendering the action of the pusher elements 40a, 40b and/or the counteracting elements 41a, 41b more precise and efficacious.

Lastly, the reference number 55 indicates terminal formations that project from the front and rear sides of each trolley 50 and perform a function that is substantially similar to that of a buffer.

As can be seen more readily from the plan view of FIG. 1, the trolleys 50 thus cooperate with each other by transmitting the thrust precisely at the point where the said buffer formations 55 come into contact with each other.

Thanks to the illustrated configuration, the trolleys 50 can therefore be subjected to the pusher action of the elements 40a and 40b (as also to the yielding and controlled braking action of the elements 41a and 41b), so that they will remain in contact with each other over the entire length of the branches 100 and 102. Nevertheless, the condition of contact between the trolleys, realized by means of the buffer formations 55, will not become translated into a condition of physical contact between adjacent containers C.

It should be clear, however, that the presence of the buffer formations 55, though a preferential feature, is not imperative. What is to all intents and purposes essential is that—in relation to the size and the shape of the containers C—the trolleys 50 should be configured in such a way as to enable each trolley 50 to cooperate with at least one adjacent trolley 50 to which it can transmit the thrust along the tracts 100 and 102 without the containers C carried on the said trolleys coming into contact with each other. In practice, though solely by way of example, the simplest way of obtaining this result is to make sure that the containers C do not project beyond the plan outline of the trolleys 50 on which they are carried.

From this it follows that, especially at the filling station 2, and more particularly at the substations 22, 23 and 24, the containers C can be raised slightly above the trolleys 50 and subjected to a vibration action without this being transmitted to the immediately adjacent containers C.

Indeed, the said containers will not be in contact with each other. Moreover, when the formations 31a intervene to raise the containers C, the said lifting action is performed through the openings 53 (see FIG. 3) and will therefore achieve complete physical and kinematic separation of the containers C from the trolleys 50. The vibrations applied to the containers C will not therefore become transferred neither to the trolleys 50 on which the containers are carried nor to the immediately adjacent trolleys 50.

The trolleys 50 are usually provided with positioning formations—of a type known as such to the state of the art—intended to make sure that the containers C will maintain a substantially fixed position with respect to the trolley 50 on which they are carried.

Naturally, the realization details and the implementation forms can be widely varied with respect to what has here been described and illustrated without in any way altering the principle of the present invention or going beyond its scope. This applies, for example, as regards the manner in which the trolleys 50 are moved: leaving completely intact the possibility of the trolleys to cooperate by thrust transmission without this becoming translated into direct contact between the containers C, one can yet think of propulsion solutions different from the one constituted by the pusher elements 40a and 40b. This applies also as regards the possibility of mounting the said trolleys 50 on supporting elements different from the rollers 51 mentioned, by way of example, in the description given hereinabove. It will readily be appreciated, moreover, that the solution according to the invention does not in any way call for the presence of two conveyor tracts like the rectilinear and parallel tracts 100 and 102. Indeed, the invention can be employed both when only one such tract is present, and also in the presence of any number of such tracts, be they arranged in parallel and/or obliquely. Again, the invention can also be applied to the case of conveyor tracts that are curved rather than rectilinear (for example, tracts in the form of a C or an S), always provided that the trolleys 50 can still be made to cooperate with each other in thrust transmission when they are aligned on such a curved tract.

What is claimed is:

1. A system for conveying containers comprising at least one conveyor tract along which a line of said containers is made to move forward by means of a pushing action applied at one end of the line, the system including a plurality of transport elements adapted to be aligned on said at least one conveyor tract and capable of receiving for transport purposes at least one container of said line, with the containers of said line separated from each other, each of said transport elements being disconnected from each other and capable of cooperating in thrust transmission with at least one adjacent transport element, so that said pushing action applied to said transport elements produces the forward movement of said line of containers while said containers are kept separate from each other, the system further including at least one processing station where there are provided lifting means for raising said containers with respect to said transport elements, wherein said transport elements have at least one opening to permit the passage of said lifting means through said at least one opening in said transport elements, wherein said at least one opening is of such size as to permit the free passage of said lifting means in a condition of substantial absence of any cooperation relationship between said transport elements and said lifting means and wherein with said at least one processing station there are associated vibration generation means for acting on said containers maintained in a raised position with respect to said transport elements by said lifting means, the arrangement being such that the vibratory movement of said vibration generation means is realized in substantial absence of transmission of said vibratory movement to said transport elements.

2. A system in accordance with claim 1, the system further including, located at one end of said at least one conveyor tract, a pusher element capable of selectively applying a pushing action to a line of said transport elements aligned on said at least one conveyor tract, and fine adjustment means for cooperating with said transport elements in order to position said transport elements in at least one accurately determined position on said at least one conveyor tract, wherein said transport elements have at least one formation adapted to be engaged by said fine adjustment means, and wherein said means adapted to be engaged by the fine adjustment means comprise at least on cavity situated on one side of the respective transport element.

3. A system in accordance with claim 2, wherein said means adapted to be engaged by the fine adjustment means comprise at least two opposite cavities situated on opposite sides of the respective transport element.

* * * * *